T. HOTCHKISS.
Assignor, by mesne assignments, to himself and E. WHITING.
Friction-Wheels.
No. 8,794. Reissued July 8, 1879.
*Fig 1.* *Fig 2.*
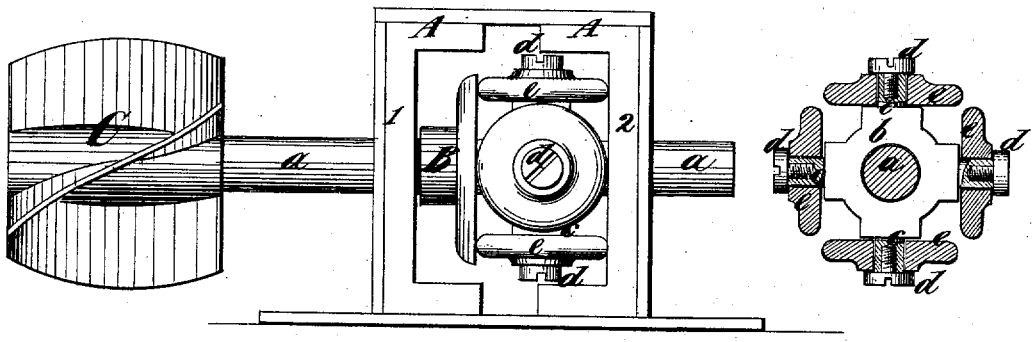
*Witnesses:*
Chandler Hall,
Thomas E. Birch.
*Inventor.*
Truman Hotchkiss
by his Attorney
Edwin H. Brown
N. PETERS, PHOTO-LITHOGRAPHER, WASHINGTON, D. C.

UNITED STATES PATENT OFFICE.

TRUMAN HOTCHKISS, OF STRATFORD, CONNECTICUT, ASSIGNOR, BY MESNE ASSIGNMENTS, TO HIMSELF AND EZRA WHITING, OF SAME PLACE.

IMPROVEMENT IN FRICTION-WHEELS.

Specification forming part of Letters Patent No. 63,520, dated April 2, 1867; Reissue No. 8,794, dated July 8, 1879; application filed March 1, 1879.

*To all whom it may concern:*

Be it known that I, TRUMAN HOTCHKISS, of Stratford, in the county of Fairfield and State of Connecticut, have invented a new and useful Improvement in Friction Rolls or Wheels, of which the following is a full description.

This invention is intended to operate where there is a pressure to be exerted in the direction of the axis or spindle, and is useful for propellers, turn-tables, and other cases where the spindle revolves.

It consists in the combination of a shaft or spindle, a thrust-bearing therefor, anti-friction rollers, and a loose collar on the said shaft or spindle, comprising bearings for such rollers.

It also consists in the combination of a shaft or spindle, a thrust-bearing therefor, anti-friction rollers, a loose collar on the shaft or spindle, comprising bearings for the anti-friction rollers, and a device connected with said shaft or spindle, and adapted to rotate in the water, and thereby impart motion to the part with which it is connected.

It also consists in various details of parts, to be hereinafter set forth.

In the accompanying drawings, Figure 1 is a side elevation of mechanism embodying my improvements, and Fig. 2 is a vertical transverse section of the same.

Similar letters of reference designate corresponding parts in both figures.

*a* designates a shaft or spindle passing through the cross-pieces 1 and 2 in a frame, A.

*b* designates a loose collar upon the shaft or spindle between the cross-piece 2, which forms a thrust-bearing for the shaft or spindle, and a fixed collar, B, upon the said shaft or spindle. A series of anti-friction rollers, *e*, having bearings upon the loose collar, rotate and revolve around the shaft or spindle, and relieve the thrust-bearing of friction, which would otherwise be generated between it and the shaft or spindle. These anti-friction rollers are represented as wheel-shaped, and as arranged on axles *c*, radiating from the loose collar *b*, and held in place by means of the heads of screws *d*, inserted in the radial axles.

C designates a propeller or a device for rotating in the water, connected to the shaft or spindle, and imparting motion to the same and to that with which it is connected.

The thrust or strain exerted longitudinally on the shaft or spindle by the propeller being toward the frame, the rollers and collar, operating as described, will greatly lessen the friction.

What I claim as my invention, and desire to secure by Letters Patent, is—

1. The combination of a shaft or spindle, a thrust-bearing therefor, anti-friction rollers, and a loose collar on the shaft or spindle, comprising bearings for the said rollers.

2. The combination of a shaft or spindle, a thrust-bearing therefor, anti-friction rollers, and a loose collar on the shaft or spindle, comprising bearings for said rollers, and capable of adjustment relatively to said thrust-bearing.

3. The combination of a shaft or spindle, a thrust-bearing therefor, anti-friction rollers, and a loose collar on said shaft or spindle, provided with means for retaining the said rollers in proper relation to the shaft or spindle.

4. The combination of a shaft or spindle, a rectangular frame comprising a thrust-bearing therefor, anti-friction rollers arranged around said shaft or spindle and within said frame, and a loose collar on the shaft or spindle, provided with arms forming bearings for said anti-friction rollers.

5. The combination of a shaft or spindle, a thrust-bearing therefor, anti-friction wheel-shaped rollers, and a loose collar on the shaft or spindle, provided with arms forming bearings for said rollers.

6. The combination of a shaft or spindle, a thrust-bearing therefor, anti-friction rollers, a loose collar on the shaft or spindle, comprising bearings for the anti-friction rollers, and a device connected with said shaft or spindle adapted to rotate in the water.

7. The combination of a shaft or spindle, a thrust-bearing therefor, anti-friction rollers, a loose collar on the shaft or spindle, and a device adapted to rotate in the water, connected with the said shaft or spindle.

8. The combination of a shaft or spindle, anti-friction rollers, a loose collar on the shaft or spindle, comprising bearings for said rollers, a fixed collar on the shaft or spindle, impinging against the anti-friction rollers, and a device adapted to rotate in the water, connected to said shaft or spindle.

9. The combination of a shaft or spindle, anti-friction rollers, a loose collar on the shaft or spindle, comprising bearings for said rollers, and a fixed collar on the shaft or spindle, impinging against the anti-friction rollers.

10. The combination of a shaft or spindle, a thrust-bearing therefor, anti-friction wheel-shaped rollers, a loose collar on the shaft or spindle, provided with bearings for the anti-friction rollers, and screws for retaining said rollers in place.

TRUMAN HOTCHKISS.

Witnesses:
F. H. FELLOWS,
ROB. H. RUSSELL.